March 25, 1952  M. ZISKIN ET AL  2,590,596

TEAKETTLE

Filed April 8, 1948

INVENTORS.
MANUEL S. ZISKIN
RALPH B. BILLIG
BY
William Isler
ATTORNEY

Patented Mar. 25, 1952

2,590,596

UNITED STATES PATENT OFFICE 2,590,596

TEAKETTLE

Manuel S. Ziskin, University Heights, and Ralph B. Billig, Erieside, Ohio, assignors to Kromex Corporation, Cleveland, Ohio, a corporation of Ohio Application April 8, 1948, Serial No. 19,684

5 Claims. (Cl. 222—474)

This invention relates, as indicated, to a teakettle.

A primary object of the invention is to provide a teakettle of this character which is neat and attractive in appearance, of compact and simple design and construction, and well adapted for normal usage, that is, for the heating or boiling of water for domestic uses.

Another object of the invention is to provide a teakettle having a handle of unique and attractive design, a spout closure, of unique design, and novel means associated with the handle for raising and lowering the spout closure, such closure operating means consisting of a minimum number of parts, which are readily accessible to the user of the teakettle.

A further object of the invention is to provide a teakettle having a spout of such dimensions or dimensional relation to the body of the kettle as to permit cleaning or scouring of the kettle by insertion of the hand through the spout.

A still further object of the invention is to provide a teakettle of the character described, the component parts of which are of such simple construction, and are so easy to assemble and disassemble, as to permit of manufacture of the teakettle in commercially desirable quantities, and at relatively low cost.

Other objects and advantages of the invention will be apparent during the course of the following description.

In the accompanying drawing, forming a part of this specification, and in which like numerals are employed to designate like parts throughout the same.

Figure 1:
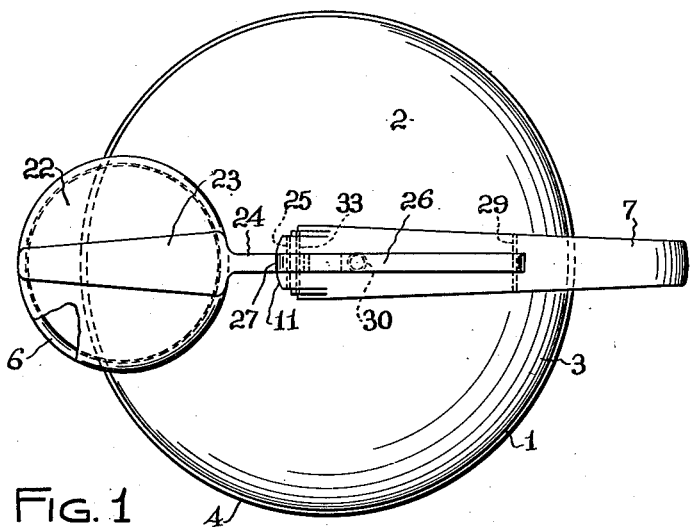
Fig. 1 is a top plan view of a teakettle embodying the invention.
Figure 4:
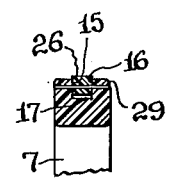
Fig. 4 is a fragmentary cross-sectional view, taken on the line 4—4 of Fig. 2.

Referring more particularly to the drawings, the teakettle will be seen to comprise a sheet metal container or receptacle having a cylindrical body portion 1, and a top 2 formed integrally with such body portion and united with the latter by a rounded portion 3. A flanged bottom 4, also formed of sheet metal, is welded, lock-seamed, or otherwise secured to the lower edge of the body 1 of the container.

The body 1 of the container is also provided with a spout 5 which is preferably formed integrally with such body, and is provided at its upper end with a slightly flared flange or lip 6.

The teakettle is further provided with a handle, preferably molded in one piece from a plastic, such, for example, as Lucite. This handle is formed to provide a central portion 7 shaped or curved to conform with or generally follow the contour of the body of the kettle, a foot-piece 8 which extends at an inclination to the body 1 of the kettle, and is secured to the latter by means of a crew 9 and stake nut 10, and a foot-piece 11, which extends vertically to the central portion of the top 2 of the kettle, and is secured to the latter by means of a screw 12 and stake nut 13. The handle, as thus shaped and secured to the kettle, is well-adapted for handling during pouring, being so disposed as to interfere to a minimum extent with the pouring operation.

The handle is provided in its upper side with a longitudinally-extending central slot 14, having vertical parallel side walls 15 and 16, and a horizontal flat bottom 17, and the foot-piece 11 is provided in its front or forward side with a vertical-extending central slot 18, having vertical parallel side walls 19 and 20, and a horizontal flat bottom 21. The slot 18 communicates at its upper end with the slot 14, the wall 19 of the slot 18 being coplanar with the wall 15 of the slot 14, and the wall 20 of the slot 18 being coplanar with the wall 16 of the slot 14.

The kettle further includes a closure or lid 22 for the spout 5, which closure or lid is preferably molded in one piece from a plastic similar to that from which the handle is made. This closure or lid is molded to provide a rib 23 which extends diametrically across the upper surface of the lid, and has an extension 24 of a reduced width corresponding to the width of the slot 18. The closure or lid 22 normally rests on the lip 6 of the spout 5, as shown in Figs. 1 and 2, with the extension 24 of the rib 23 extending into the lower end of the slot 18, and pivotally secured within such slot by means of a pin 25, the ends of which are mounted in the foot-piece 11 of the handle.

Figure 2:
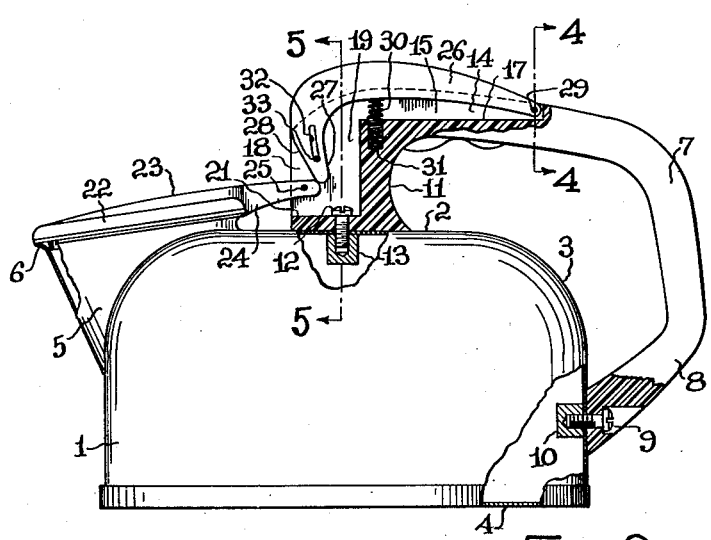
Fig. 2 is a side elevational view of the teakettle, with portions thereof broken away or removed, to show certain details of construction, the spout closure or lid being shown in closed position.
Figure 5:
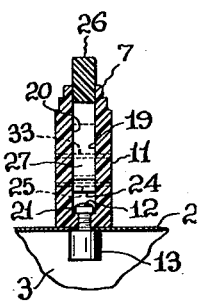
Fig. 5 is a fragmentary cross-sectional view, taken on the line 5—5 of Fig. 2.

The kettle further includes a closure operator in the form of a lever 26, of a width corresponding to the width of the slot 14, and having an angularly extending forward or toe portion 27, which normally rests on the rear of the extension 24, as best shown in Fig. 2. The toe 21 of the lever 26 has an inclined cam surface 28. The lever 26 is pivotally secured within the slot 14 by means of a pin 29, the ends of which are mounted in the portion 7 of the handle, and is normally maintained in the position shown in Figs. 1 and 2 by means of a compression coil spring 30, which is mounted in a recess 31 of the handle 7, and bears against the lower surface of the lever.

For the purpose of preventing displacement of the lever 26 from the slots 14 and 18, while permitting movement of the lever within its predetermined limits of movement, the toe portion 27 of the lever is provided with an arcuate slot 32, through which a pin 33 extends, the ends of this pin being mounted in the foot-piece 11 of the handle. The arc of the slot 32 is described about the axis of the pin 29 as a center.

The kettle, as thus described, is neat and attractive in appearance, is extremely compact and simple in design and construction, and is admirably adapted for normal usage, that is for the heating or boiling of water for various purposes.

Figure 3:
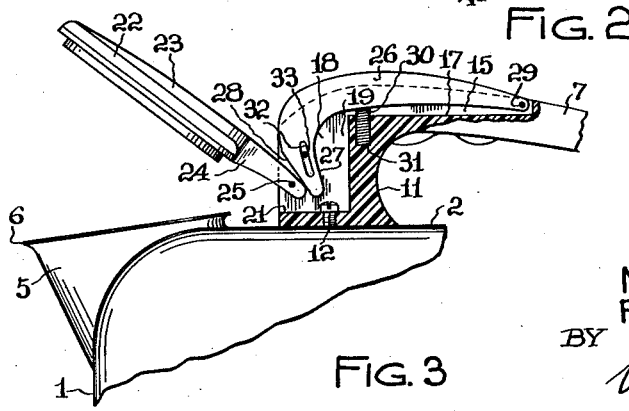
Fig. 3 is a fragmentary view, similar to Fig. 2, but showing the spout closure or lid in open position.

It may be filled with water to the desired depth, the water being introduced through the spout and also dispensed therethrough after being heated. In thus dispensing the water through the spout, the lever 26 is depressed by the thumb of the hand which holds the kettle from the position shown in Fig. 2 to that shown in Fig. 3. This causes the cam surface 28 of the lever to slide along the adjacent surface of the extension 24 of the closure 22, thereby rocking the closure to the position shown in Fig. 3. Upon release of the lever 26, the conjoint weight of the closure 22 and action of the spring 30 serves to bring the closure to its closed position.

It may be noted that the diameter of the spout 5 is almost half the diameter of the body portion 1 of the teakettle. In actual practice, the diameter of the body portion 1 is about 7½ inches, whereas the diameter of the spout 5 is from about 3 to 3½ inches. With this diameter of spout, or dimensional relationship and location of the spout relatively to the body of the kettle, it is possible for the average woman to clean or scour the interior of the kettle by inserting her hand into and through the spout. In this way, the necessity for a separate closure or lid for this purpose is obviated.

It will also be apparent that the handle is of unique and attractive design, that the spout closure is of unique design, that the closure operating means consists of a minimum number of parts which are readily accessible to the user of the teakettle, and that the component parts are of simple construction, and are so easy to assemble and disassemble, as to permit of manufacture of the teakettle in commercially desirable quantities, and at relatively low cost.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention we claim:

1. In a teakettle of the character described, a receptacle having a body portion and closed top, a spout extending from said receptacle, a closure for said spout, a handle secured to said receptacle, means for raising said closure, said means comprising a lever pivotally mounted in the upper portion of said handle, and adapted to be depressed by the thumb of the hand which grasps said handle, and means constraining said lever to move in a predetermined pivotal path and preventing said lever from becoming displaced from said handle, said last-named means comprising an arcuate slot extending transversely through the lever and a pin extending through said slot and having its ends mounted in said handle.

2. A teakettle, as defined in claim 1, in which the arc of said slot has as its center the axis of pivotal mounting of the handle.

3. In a teakettle of the character described, a receptacle having a cylindrical body portion and a closed top, a spout extending from said receptacle, a closure for said spout, said closure having a rearward extension, a handle secured to said receptacle, a pivot pin mounted in said handle and extending transversely of the handle, and means for raising said closure, said means comprising a lever mounted in the upper portion of said handle and secured to said pin, said lever having an angularly and downwardly extending toe portion formed integrally therewith and in direct contact with the closure extension, said lever adapted to be depressed by the thumb of the hand which grasps said handle and to be moved in an arcuate path as it is depressed.

4. A teakettle, as defined in claim 3, in which said toe portion has an inclined cam surface which engages the rear end of said extension.

5. A teakettle, as defined in claim 4, in which said closure extension is pivotally secured to said handle.

MANUEL S. ZISKIN.
RALPH B. BILLIG.

REFERENCES CITED

The following references are of record in the file of this patent:

UNITED STATES PATENTS

| Number | Name | Date |
| --- | --- | --- |
| 1,413,282 | Lowenstein | Apr. 18, 1922 |
| 2,197,141 | Belden | Apr. 16, 1940 |
| 2,364,206 | Gardes | Dec. 5, 1944 |

FOREIGN PATENTS

| Number | Country | Date |
| --- | --- | --- |
| 518,114 | Great Britain | Feb. 19, 1940 |